(12) United States Patent
Lee (10) Patent No.: US 10,552,073 B2
(45) Date of Patent: Feb. 4, 2020

(54) STORAGE SYSTEM INCLUDING NON-VOLATILE MEMORY DEVICE

(71) Applicant: SAMSUNG ELECTRONICS CO., LTD., Suwon-si, Gyeonggi-do (KR)

(72) Inventor: Jupyung Lee, Incheon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 98 days.

(21) Appl. No.: 15/589,538

(22) Filed: May 8, 2017

(65) Prior Publication Data
US 2017/0371572 A1 Dec. 28, 2017

(30) Foreign Application Priority Data
Jun. 23, 2016 (KR) .................. 10-2016-0078842

(51) Int. Cl.
*G06F 3/06* (2006.01)
*G06F 11/14* (2006.01)

(52) U.S. Cl.
CPC .............. *G06F 3/064* (2013.01); *G06F 3/061* (2013.01); *G06F 3/0608* (2013.01); *G06F 3/0649* (2013.01); *G06F 3/0652* (2013.01); *G06F 3/0679* (2013.01); *G06F 3/0688* (2013.01); *G06F 11/1446* (2013.01); *G06F 11/1461* (2013.01); *G06F 2201/84* (2013.01)

(58) Field of Classification Search
CPC .. G06F 2201/84; G06F 3/0679; G06F 3/0652; G06F 12/0253; G06F 2212/7205; G06F 3/0688; G06F 12/0246; G06F 3/064–0644; G06F 12/02; G06F 11/1446–1458; G06F 3/0638
See application file for complete search history.

(56) References Cited

U.S. PATENT DOCUMENTS 8,935,446 B1 1/2015 Shilane et al.
9,069,710 B1 * 6/2015 Modukuri ........... G06F 11/2051
9,098,522 B2 8/2015 Lee et al.
(Continued)

OTHER PUBLICATIONS

Jeong-Uk Kang et al., "The Multi-streamed Solid-State Drive", Jun. 18, 2014, USENIX, HotStorage'14 Proceedings of the 6th USENIX conference on Hot Topics in Storage and File Systems, pp. 1-5 (Year: 2014).*

*Primary Examiner* — Reginald G Bragdon
*Assistant Examiner* — Curtis James Kortman
(74) *Attorney, Agent, or Firm* — F. Chau & Associates, LLC (57) ABSTRACT

A storage system includes a nonvolatile memory device and a controller. The nonvolatile memory device includes first and second memory blocks and stores data corresponding to first and second volumes. The controller performs a snapshot function on the data corresponding to the first and second volumes and determines data to be stored in the first and second memory blocks based on parameters for generating snapshots of the first and second volumes. The controller stores data corresponding to a snapshot deleted at a first time point in the first memory block, stores data corresponding to a snapshot deleted at a second time point in the second memory block, adds the first memory block to a victim block list after the first time point, and adds the second memory block to the victim block list after the second time point.

12 Claims, 8 Drawing Sheets

| Time | | t1 | t2 | t3 | t4 | t5 | t6 | t7 | t8 | t9 |
|---|---|---|---|---|---|---|---|---|---|---|
| Volume 1 | Generated | s11 | s12 | s13 | s14 | s15 | s16 | s17 | s18 | s19 |
| | Deleted | Max of snapshot = 5 | | | | | s11 | s12 | s13 | s14 |
| Volume 2 | Generated | s21 | s22 | s23 | s24 | s25 | s26 | s27 | s28 | s29 |
| | Deleted | Max of snapshot = 4 | | | | | s21 | s22 | s23 | s24 | s25 |
| Victim Block List | | | | | | | B1 | | B2 | B3 |

(56) References Cited

U.S. PATENT DOCUMENTS

| | | |
|---|---|---|
| 9,141,302 B2 | 9/2015 | Bennett |
| 9,223,696 B2 | 12/2015 | Shin et al. |
| 9,250,817 B2 | 2/2016 | Flynn et al. |
| 2009/0319582 A1* | 12/2009 | Simek ................. G06F 11/1469 |
| 2013/0246722 A1* | 9/2013 | Suzuki ................. G06F 3/0608 |
| | | 711/162 |
| 2014/0032817 A1* | 1/2014 | Bux ................... G06F 12/0246 |
| | | 711/103 |
| 2014/0089265 A1* | 3/2014 | Talagala ............. G06F 16/2477 |
| | | 707/674 |
| 2014/0173183 A1* | 6/2014 | Shin .................. G06F 12/0246 |
| | | 711/103 |
| 2014/0281307 A1 | 9/2014 | Peterson et al. |
| 2014/0325115 A1 | 10/2014 | Ramsundar et al. |
| 2015/0032982 A1 | 1/2015 | Talagala et al. |
| 2016/0019117 A1* | 1/2016 | Kumarasamy ...... G06F 11/1417 |
| | | 707/650 |

* cited by examiner

| Block 1 | Block 2 |
|---|---|
| Volume 1 & Volume 2 | Volume 3 |
| D1_v1 (Invalid) | D1_v3 (Invalid, locked) |
| D2_v1 (Invalid) | D2_v3 (Invalid, locked) |
| D1_v1_1 | D3_v3 |
| D2_v1_1 | D1_v3_1 |
| D1_v2 (Invalid) | D4_v3 |
| D1_v2_1 | D2_v3_1 |

Victim Block List

| Time | | t1 | t2 | t3 | t4 | t5 | t6 | t7 | t8 | t9 |
|---|---|---|---|---|---|---|---|---|---|---|
| Volume | Generated | s1 | s2 | s3 | s4 | s5 | s6 | s7 | s8 | s9 |
| | Deleted | Max of snapshot = 5 | | | | | s1 | s2 | s3 | s4 |

FIG. 6

| Time | | t1 | t2 | t3 | t4 | t5 | t6 | t7 | t8 | t9 |
|---|---|---|---|---|---|---|---|---|---|---|
| Volume 1 | Generated | s11 | s12 | s13 | s14 | s15 | s16 | s17 | s18 | s19 |
| | Deleted | Max of snapshot = 5 | | | | | s11 | s12 | s13 | s14 |
| Volume 2 | Generated | s21 | s22 | s23 | s24 | s25 | s26 | s27 | s28 | s29 |
| | Deleted | Max of snapshot = 4 | | | | s21 | s22 | s23 | s24 | s25 |
| Victim Block List | | | | | | | B1 | B2 | B3 | B4 |

FIG. 7

| Time | | t1 | t2 | t3 | t4 | t5 | t6 | t7 | t8 | t9 |
|---|---|---|---|---|---|---|---|---|---|---|
| Volume 1 | Generated | s11 | s12 | s13 | s14 | s15 | s16 | s17 | s18 | s19 |
| | Deleted | | Max of snapshot = 5 | | | | s11 | s12 | s13 | s14 |
| Volume 2 | Generated | s21 | s22 | s23 | s24 | s25 | s26 | s27 | s28 | s29 |
| | Deleted | | Max of snapshot = 4 | | | s21 | s22 | s23 | s24 | s25 |
| Victim Block List | | | | | | | B1 | | B2 | B3 |

FIG. 8

| Time | | t1 | t2 | t3 | t4 | t5 | t6 | t7 | t8 | t9 | t10 | t11 |
|---|---|---|---|---|---|---|---|---|---|---|---|---|
| Volume 1 | Generated | sa1 | sa2 | sa3 | sa4 | sa5 | sa6 | sa7 | sa8 | sa9 | sa10 | sa11 |
| | Deleted | | Max of snapshot = 5 | | | | sa1 | sa2 | sa3 | sa4 | sa5 | sa6 |
| Volume 2 | Generated | sb1 | sb2 | sb3 | | | sb4 | | sb5 | | sb6 | |
| | Deleted | | Max of snapshot = 3 | | | | sb1 | | sb2 | | sb3 | |
| Victim Block List | | | | | | | | B1 | | B2 | | B3 |

FIG. 9

| Time | | t1 | t2 | t3 | t4 | t5 | t6 | t7 | t8 | t9 | t10 | t11 | t12 |
|---|---|---|---|---|---|---|---|---|---|---|---|---|---|
| Volume 1 | Generated | sa1 | sa2 | sa3 | sa4 | sa5 | | sa6 | | | | | |
| | Deleted | | | | Max of snapshot = 3 | | | sa1 | | sa2 | | sa3 | |
| Volume 2 | Generated | | sb1 | | sb2 | | sb3 | | sb4 | | sb5 | | sb6 |
| | Deleted | | | Max of snapshot = 3 | | | | | sb1 | | sb2 | | sb3 |
| Victim Block List | | | | | | | | | B1 | | B2 | | B3 |

FIG. 10

STORAGE SYSTEM INCLUDING NON-VOLATILE MEMORY DEVICE

CROSS-REFERENCE TO RELATED APPLICATIONS

This application claims priority under 35 U.S.C. § 119 to Korean Patent Application No. 10-2016-0078842, filed on Jun. 23, 2016, in the Korean Intellectual Property Office, the disclosure of which is incorporated by reference in its entirety herein.

BACKGROUND

1. Technical Field

Embodiments of the inventive concept disclosed herein relate to a storage system, and more particularly, to a storage system including a nonvolatile memory device.

2. Discussion of Related Art

A solid state drive (SSD) is a data storage device composed of semiconductor memory devices. The SSD may be used like a hard disk drive by using a host interface standard such as parallel advanced technology attachment (PATA) or serial ATA (SATA). The SSD does not include spinning disks or movable read/write heads, has good stability, can access information at a high speed, and uses very little power.

Semiconductor memory devices are roughly classified into a volatile memory device and a nonvolatile memory device. Read and write speeds of the volatile memory device are fast, but data stored therein is lost when a power supply is interrupted. In contrast, the nonvolatile memory device retains data stored therein even though the power supply is interrupted. Therefore, the nonvolatile memory device may be preferred when information needs to be retained regardless of whether power is supplied.

Since the nonvolatile memory device does not support an overwrite operation, the nonvolatile memory device provides free blocks through an erase operation. To prepare free blocks, the nonvolatile memory device performs a garbage collection operation periodically. However, when the SSD provides a snapshot function, the efficiency of the garbage collection operation may be decreased.

SUMMARY

At least one embodiment of the inventive concept provides a storage system including a nonvolatile memory device capable of improving the efficiency of a garbage collection operation while providing a snapshot function.

A storage system according to an exemplary embodiment of the inventive concept includes a nonvolatile memory device and a controller. The nonvolatile memory device includes first and second memory blocks and stores data corresponding to first and second volumes. The controller performs a snapshot function on the data corresponding to the first and second volumes and determines data to be stored in the first and second memory blocks based on parameters for generating snapshots of the first and second volumes. The controller stores data corresponding to a snapshot deleted at a first time point in the first memory block, stores data corresponding to a snapshot deleted at a second time point in the second memory block, adds the first memory block to a victim block list after the first time point, and adds the second memory block to the victim block list after the second time point.

A storage system according to an exemplary embodiment of the inventive concept includes a nonvolatile memory device and a controller. The nonvolatile memory device includes first and second memory blocks and stores data corresponding to first and second volumes. The controller performs a snapshot function on data corresponding to the first volume and does not perform the snapshot function on data corresponding to the second volume. The controller stores the data corresponding to the first volume in the first memory block and stores the data corresponding to the second volume in the second memory block.

A storage system according to an exemplary embodiment of the inventive concept includes a nonvolatile memory device having first and second memory blocks and configured to store data corresponding to first and second volumes and controller. The controller is configured to perform a snapshot function on the data corresponding to the first volume to generate first snapshots, to perform the snapshot function on the data corresponding to the second volume to generate second snapshots, and store the snapshots generated within a first time period in the first memory block and the snapshots generated within a second later time period in the second memory block. The controller determines which one of the memory blocks a snapshot has been deleted from, and performs garbage collection on the determined one memory block

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION OF THE EXEMPLARY EMBODIMENTS

Hereinafter, exemplary embodiments of the inventive concept will be described more fully with reference to accompanying drawings. Below, details, such as detailed configurations and structures, are provided to aid a reader in understanding embodiments of the inventive concept.

Therefore, embodiments described herein may be variously changed or modified without departing from embodiments of the inventive concept.

Figure 1:
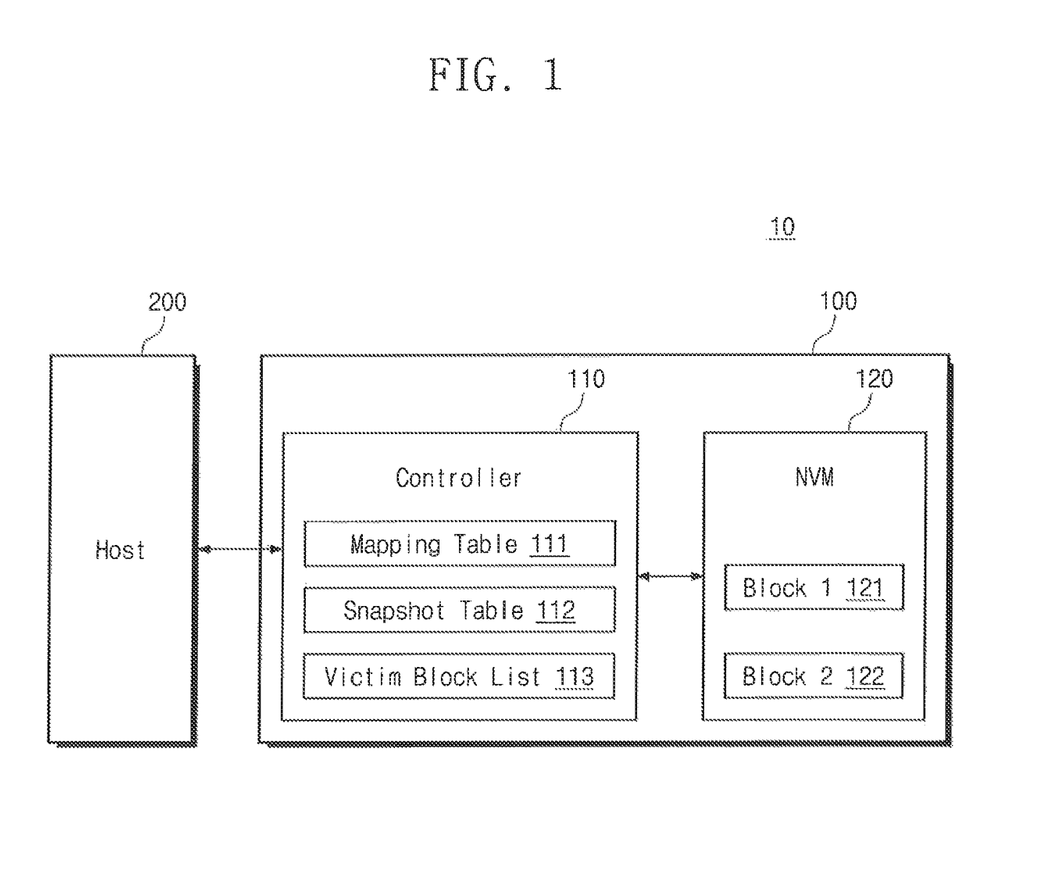
FIG. 1 is a block diagram illustrating a computing system according to an exemplary embodiment of the inventive concept.

FIG. 1 is a block diagram illustrating a computing system 10 according to an exemplary embodiment of the inventive concept. Referring to FIG. 1, the computing system 10 includes a memory system 100 and a host 200 (e.g., a host device). The memory system 100 includes a controller 110 and a nonvolatile memory device (NVM) 120.

The nonvolatile memory device 120 may store data that is received according to a request of the host 200. For example, the host 200 may send a write command and corresponding write data to the nonvolatile memory device 120. The nonvolatile memory device 120 may include at least one of various nonvolatile memory devices, such as an electrically erasable and programmable read only memory (EPROM), a flash memory, a phase-change RAM (PRAM), a resistive RAM (RRAM), and a ferroelectric RAM (FeRAM).

The controller 110 is electrically connected to the nonvolatile memory device 120. The controller 110 is configured to access the nonvolatile memory device 120. For example, the controller 110 may be configured to control a read operation, a write operation, an erase operation, and a background operation (e.g., garbage collection) of the nonvolatile memory device 120. The controller 110 is configured to provide an interface between the nonvolatile memory device 120 and the host 200. The controller 110 may be configured to drive firmware for controlling the nonvolatile memory device 120. In an embodiment, the controller 110 may include components such as, but not limited to, a random access memory (RAM), a read only memory (ROM), a processing unit (e.g., a central processing unit or processor), a host interface, a memory interface, and an error correction unit. For example, the firmware may be stored in the ROM and the processing unit may be configured to execute the firmware.

The controller 110 may communicate with an external device (e.g., a host) based on a specific communication protocol. For example, the controller 110 may communicate with the external device through at least one of various communication protocols such as, but not limited to, universal serial bus (USB), multimedia card (MMC), peripheral component interconnection (PCI), PCI-express (PCI-E), advanced technology attachment (ATA), serial-ATA (SATA), parallel-ATA (PATA), a small computer small interface (SCSI), an enhanced small disk interface (ESDI), integrated drive electronics (IDE), and Firewire.

The controller 110 and the nonvolatile memory device 120 may be integrated into a single semiconductor device. For example, the controller 110 and the nonvolatile memory device 120 may be integrated into a single semiconductor device to form a SSD. The controller 110 and the nonvolatile memory device 120 may be integrated in a single semiconductor device to form a memory card. For example, the controller 110 and the nonvolatile memory device 120 may be integrated into a single semiconductor device to form a memory card such as, but not limited to, a PC card (a personal computer memory card international association (PCMCIA) card), a compact flash card (CF), a smart media card (SM, SMC), a memory stick, a multimedia card (MMC, RS-MMC, or MMCmicro), an SD card (SD, miniSD, microSD, or SDHC), and universal flash storage (UFS).

In an embodiment, the computing system 10 forms a ultra-mobile PC (UMPC), a workstation, a net-book, personal digital assistants (PDA), a portable computer, a web tablet, a tablet computer, a wireless phone, a mobile phone, a smartphone, e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, storage devices constituting a data center, a device which sends and receives information in a wireless environment, one of various electronic devices constituting a home network, one of various electronic devices constituting a computer network, one of various electronic devices constituting a telematics network, a radio frequency identification (RFID) device, or one of various components constituting a computing system.

In an embodiment, the memory system 100 or the nonvolatile memory device 120 may be packaged according to any of a variety of different packaging technologies. Examples of such packaging technologies may include the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

In an embodiment of the inventive concept, the controller 110 provides a snapshot function. The snapshot function refers to a function of recovering lost data in the case where a portion of data is damaged due to mistake of a user or a system crash. To provide the snapshot function, the controller 110 stores data at intervals of specific time points. In the case where a data recovery request is issued, the controller 110 may replace lost data with data of a specific time point that is stored before the data recovery request. To recover data at a time point when a user wants, there is a need for generating snapshots more frequently.

In an embodiment, a snapshot is generated for each volume. For example, a volume may be defined as a partition for distinguishing the nonvolatile memory device 120 logically. A period at which the snapshot is generated may be differently determined for respective volumes. As an example, a snapshot could be generated for a first volume at a rate of one snapshot every 10 minutes, whereas a snapshot could be generated for a second volume at different rate one snapshot every 20 minutes. In an embodiment, a volume is a logical drive, which is a single accessible storage area with a single file system, which may be resident on a single partition of a SSD. In an embodiment, the snapshot is a disk image (e.g., a computer file) containing the contents and structure of a disk volume. In an embodiment, the disk image is in ISO image format.

However, the snapshot function may decrease the efficiency of the garbage collection operation of the nonvolatile memory device 120. For example, data that is invalidated in a mapping table 111 is not invalidated in a snapshot table 112. Accordingly, in the case where a memory block, which includes data that is invalidated in the mapping table 111 and is not invalidated in the snapshot table 112, is selected as a garbage collection target, the nonvolatile memory device 120 may process data, which is not invalidated in the snapshot table 112, as valid data. Accordingly, the number of read and write operations may increase during the garbage collection operation.

The controller 110 includes the mapping table 111, the snapshot table 112, and an erase target block list (hereinafter referred to as "victim block list") 113. The nonvolatile memory device 120 may include at least one memory block. An embodiment is exemplified in FIG. 1 as the nonvolatile memory device 120 including two memory blocks 121 and 122. However, embodiments of the inventive concept are not limited thereto. The controller 110 manages the nonvolatile memory device 120 through the mapping table 111 and the snapshot table 112. For example, the controller 110 may map data, which is stored in the physical memory blocks 121 and 122 of the nonvolatile memory device 120, to a logical address through the mapping table 111. Also, through the snapshot table 112, the controller 110 may map data, which is stored in the physical memory blocks 121 and 122 of the nonvolatile memory device 120, to a logical address to which a snapshot is set. When performing the garbage collection operation by using the mapping table 111 and the snapshot table 112, the controller 110 stores memory blocks to be erased in the victim block list 113. The controller 110 may perform garbage collection based on the victim block list 113. For example, the victim block list 113 may identify blocks among the nonvolatile memory device 120 that are to be scheduled for garbage collection. For example, the controller 110 may add identifiers that identify the memory blocks to be erased into the victim block list 113. In an embodiment, the controller 110 performs the garbage collection. The garbage collection may include copying the valid data of multiple source memory blocks to a clean destination memory block and then erasing the source memory blocks.

The memory system 100 according to an exemplary embodiment of the inventive concept may improve the efficiency of the garbage collection operation by determining a time when the memory blocks 121 and 122 are included in the victim block list 113 based on the mapping table 111 and the snapshot table 112. For example, the memory system 100 may recognize a period (or called "snapshot generation-deletion period") at which the snapshot is generated and deleted. Accordingly, the memory system 100 may determine a memory block to be added to the victim block list 113 based on the snapshot generation-deletion period.

Figure 2:
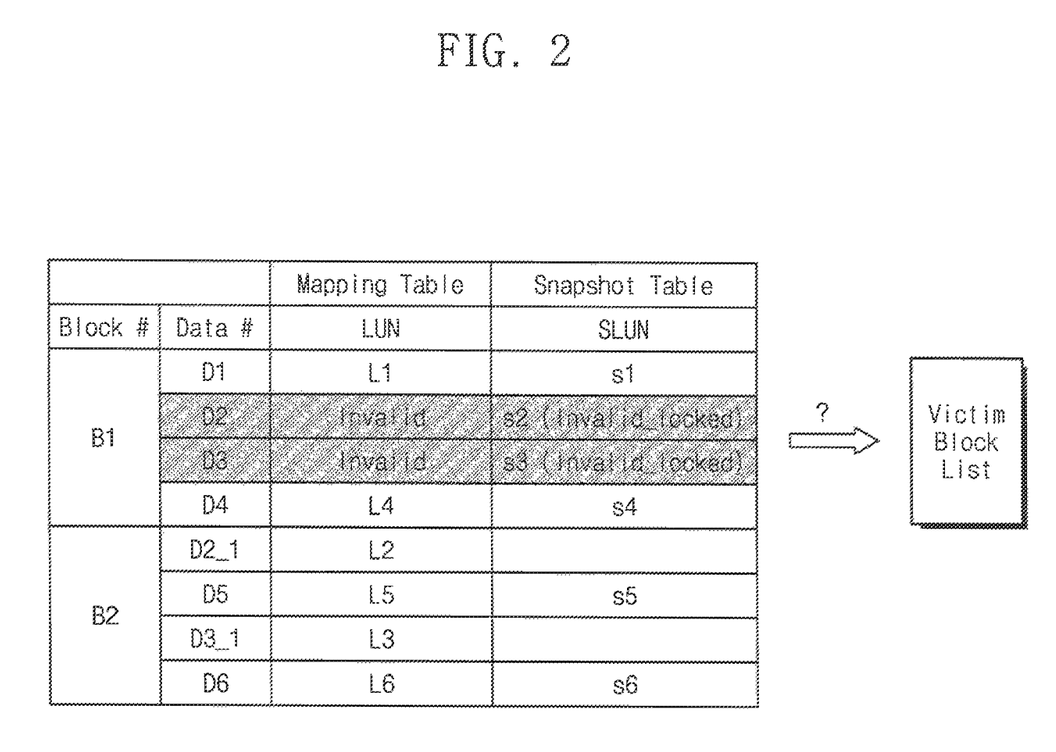
FIG. 2 is a drawing illustrating a mapping table and a snapshot table of FIG. 1.

FIG. 2 is a drawing illustrating a mapping table and a snapshot table of FIG. 1. Referring to FIGS. 1 and 2, the nonvolatile memory device 120 includes first and second memory blocks B1 and B2. However, embodiments of the inventive concept are not limited thereto.

The first memory block B1 stores first, second, third, and fourth data D1, D2, D3, and D4. The second memory block B2 stores fifth and sixth data D5 and D6 and second and third update data D2_1 and D3_1. For example, when new data corresponding to the second and third data D2 and D3 is received, the new data is stored/updated in the second memory block B2 as the second and third update data D2_1 and D3_1. Accordingly, the second and third data D2 and D3 stored in the first memory block B1 become invalidated in the mapping table 111. According to the mapping table 111, the first memory block B1 may be stored in the victim block list 113.

However, the controller 110 manages the snapshot table 112. According to the snapshot table 112, the second and third data D2 and D3 of the first memory block B1 are locked to an invalid state (Invalid_locked). The "Invalid_locked" means data that is invalidated in the mapping table 111 but is still valid in the snapshot table 112. For this reason, if the first memory block B1 is added to the victim block list 113 based on the mapping table 111, the memory system 100 moves the second and third data D2 and D3 to another memory block during the garbage collection operation.

Figure 3:
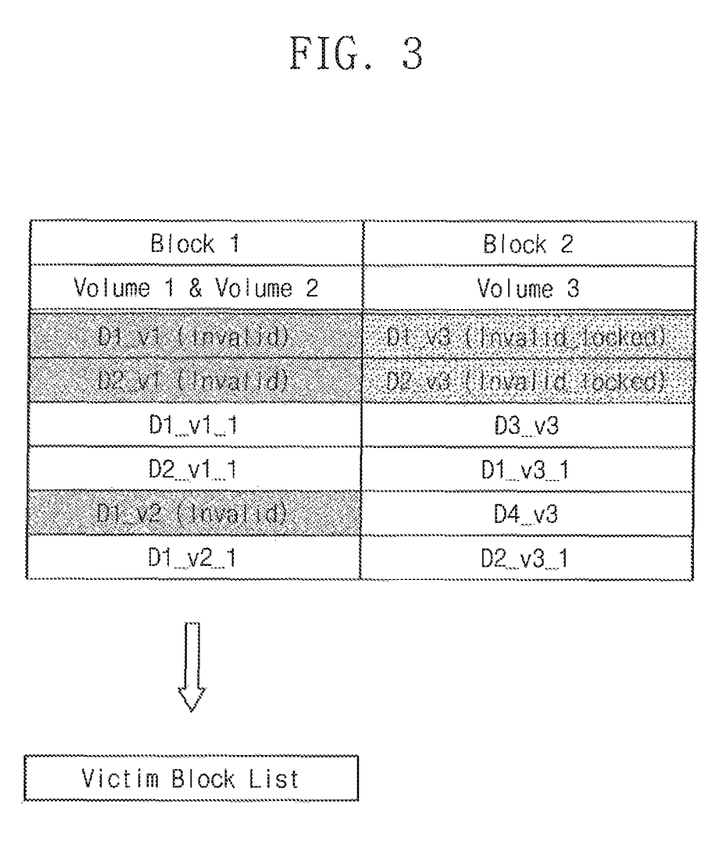
FIG. 3 is a drawing illustrating a management method of a memory system according to an exemplary embodiment of the inventive concept.

FIG. 3 is a drawing illustrating a management method of a memory system according to an exemplary embodiment of the inventive concept. Referring to FIG. 3, the memory system 100 determines a memory block, which will store data of a volume, based on a characteristic of the volume. For example, whether to use the snapshot function may be determined according to a volume. First and second volumes are volumes that do not use the snapshot function. A third volume is a volume that uses the snapshot function. For example, if a write command references writing a given memory block of the first or second volume, then the snapshot function will not be used. For example, if a write command references writing a given memory block of the third volume, then the snapshot function will be used.

Data D1_v1, D2_v1, D1_v1_1, and D2_v1_1 of the first volume and data D1_v2 and D1_v2_1 of the second volume are stored in a first memory block. Data D1_v3, D2_v3, D3_v3, D4_v3, D1_v3_1, and D2_v3_1 of the third volume are stored in a second memory block. Accordingly, even though only data of the first memory block is updated, the first memory block may include only invalidated data. For example, the first memory block does not include invalid-locked data because the first memory block stores data of volumes that do not perform the snapshot function. Also, if data of the second memory block is updated, the second memory block may include invalid-locked data because the second memory block stores data of a volume that does perform the snapshot function. In this case, the controller 110 may add the first memory block to the victim block list 113. Since the first memory block does not include invalid-locked data and includes invalid data, the first memory block can be safely added to the victim block list 113. Since the first memory block stores more invalidated data than the second memory block, the efficiency of the garbage collection operation may be improved.

Figure 4:
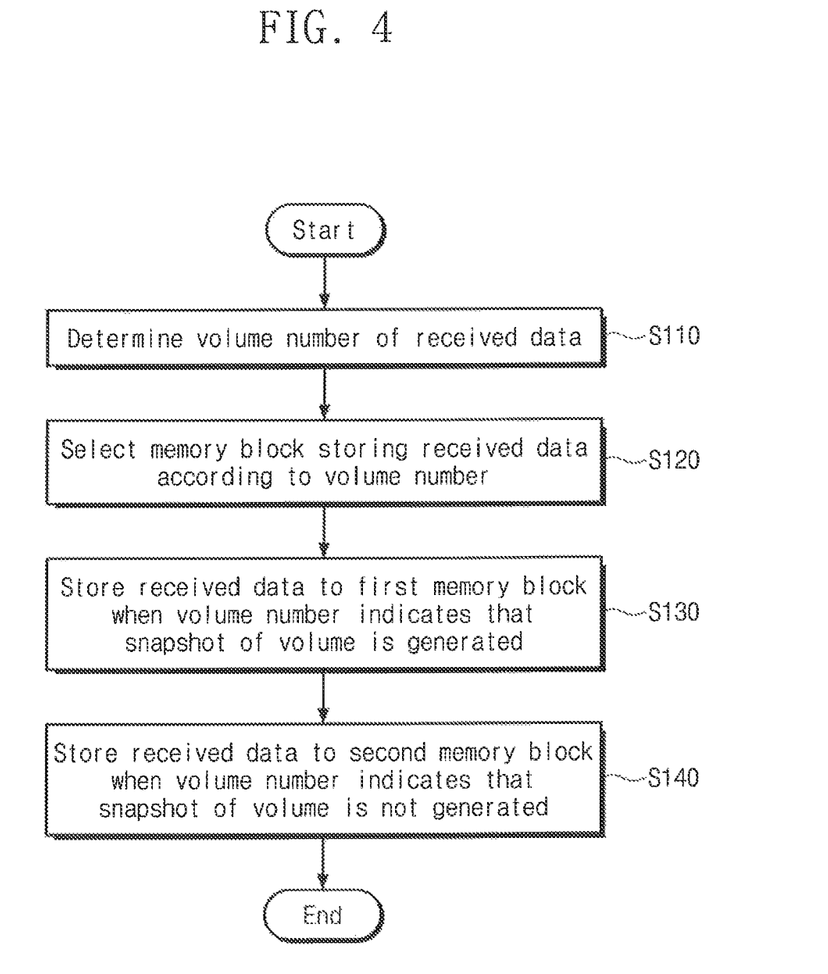
FIG. 4 is a flowchart illustrating the management method of a memory system of FIG. 3 according to an exemplary embodiment of the inventive concept.

FIG. 4 is a flowchart illustrating a management method of a memory system of FIG. 3 according to an exemplary embodiment of the inventive concept. Referring to FIG. 4, the memory system 100 stores data in different memory blocks for respective volumes based on whether to perform the snapshot function.

In operation S110, the controller 110 determines a volume number of received data. For example, whether to use the snapshot function may be differently determined according to a volume. In an embodiment, the volume number identifies the volume of an SSD that the received data is to be written to.

In operation S120, the controller 110 selects a memory block, which will store the received data, based on the volume number of the received data. For example, data of a volume that performs the snapshot function is stored in a first memory block. For example, data of a volume that does not perform the snapshot function is stored in a second memory block.

If the received data belongs to the volume that performs the snapshot function, in operation S130, the controller 110 stores the received data in the first memory block.

If the received data belongs to the volume that does not perform the snapshot function, in operation S140, the controller 110 stores the received data in the second memory block.

Figure 5:
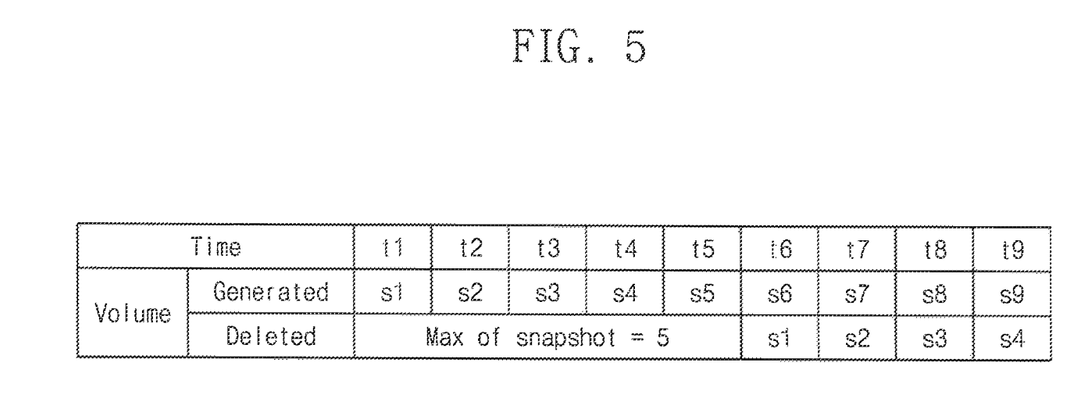
FIG. 5 is a drawing illustrating a snapshot managing method according to an exemplary embodiment of the inventive concept.

FIG. 5 is a drawing illustrating a snapshot managing method according to an exemplary embodiment of the inventive concept. Referring to FIG. 5, a snapshot of a specific volume is generated according to a predetermined period. For example, snapshots s1 to s9 are respectively generated at specific time points t1 to t9. Also, the snapshots s1 to s9 may be deleted after a predetermined time. For example, the maximum number of snapshots of a specific volume may be set to "5". In the case where the maximum number of snapshots of a specific volume is set to "5", a first snapshot s1 after a fifth snapshot s5 is generated is deleted. That is, the snapshots s1 to s4 may be sequentially deleted from a sixth time point t6.

Figure 6:
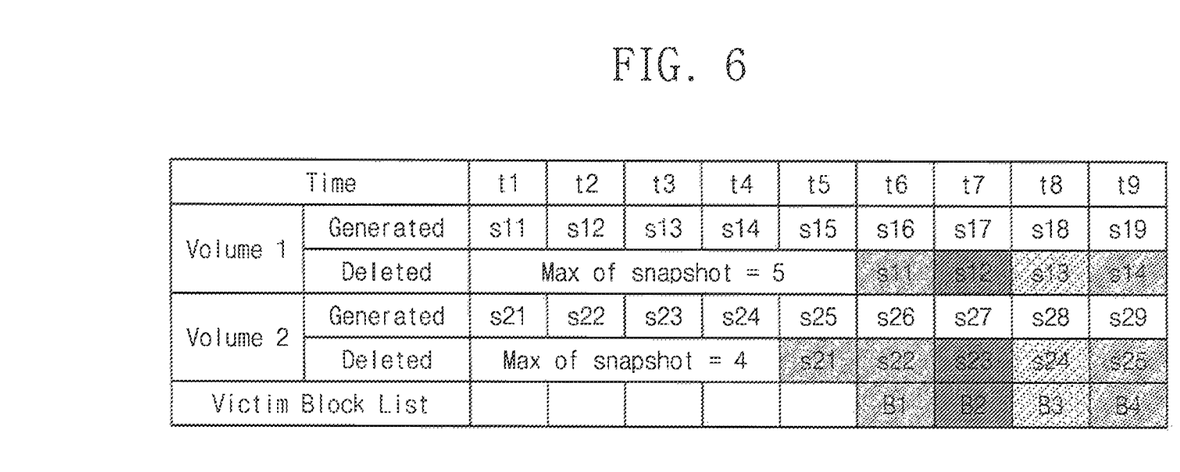
FIGS. 6 to 9 are drawings illustrating victim block list managing methods according to exemplary embodiments of the inventive concept.

FIG. 6 is a drawing illustrating a victim block list managing method according to an exemplary embodiment of the inventive concept. Referring to FIG. 6, the memory system 100 includes first and second volumes. In this example, it is assumed that both the first and second volumes perform the snapshot function. For example, the maximum number of snapshots of the first volume may be "5". The maximum number of snapshots of the second volume may be "4".

With regard to the first and second volumes, snapshots may be generated at the same period. However, since the maximum number of snapshots of the first volume is different from the maximum number of snapshots of the second volume, a time point when a snapshot of the first volume is deleted may be different from a time point when a snapshot of the second volume is deleted. For example, a first snapshot s11 of the first volume is deleted at a sixth time point t6. In contrast, a first snapshot s21 of the second volume is deleted at a fifth time point t5.

The controller 110 may store data corresponding to snapshots deleted at the same or similar time points in the same memory block. For example, data that corresponds to snapshots s11, s21, and s22 deleted at the sixth time point t6 and before the sixth time point t6 may be stored in a first memory block B1. Data that corresponds to snapshots s12 and s23 deleted at a seventh time point t7 are stored in a second memory block B2. Data that corresponds to snapshots s13 and s24 deleted at an eighth time point t8 are stored in a third memory block B3. Data that corresponds to snapshots s14 and s25 deleted at a ninth time point t9 are stored in a fourth memory block B4. In an embodiment, snapshots that are scheduled to be deleted at a future set of times that are close together or adjacent in time, are stored in a same memory block.

Data that corresponds to snapshots deleted at the same or similar time points may be invalidated at the same or similar time points. Accordingly, if data corresponding to snapshots deleted at the same or similar time points is stored in one memory block, the memory block is added to the victim block list 113 after a time point when the data corresponding to the deleted snapshots are invalidated. The memory block may include a lot of invalidated data after being added to the victim block list 113, thereby improving the efficiency of the garbage collection operation.

Figure 7:
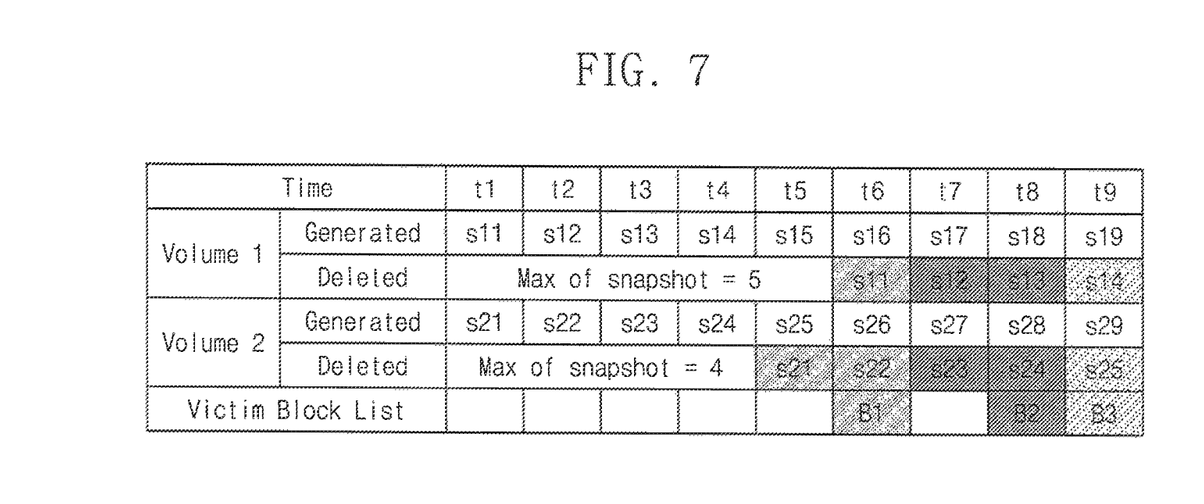

FIG. 7 is a drawing illustrating a victim block list managing method according to an exemplary embodiment of the inventive concept. Referring to FIG. 7, the memory system 100 includes first and second volumes. In this example, the first and second volumes perform the snapshot function. For example, the maximum number of snapshots of the first volume may be "5". The maximum number of snapshots of the second volume may be "4". With regard to the first and second volumes, snapshots may be generated at the same period.

Unlike that of the embodiment of FIG. 6, the number of snapshots to be stored in a memory block may be differently set. The reason is that the size of data corresponding to a snapshot is variable. For example, data that corresponds to snapshots s11, s21, and s22 deleted at the fifth time point t5 and the sixth time point t6 are stored in the first memory block B1. Data that corresponds to snapshots s12, s23, s13, and s24 deleted at the seventh time point t7 and the eighth time point t8 are stored in the second memory block B2. Data that corresponds to snapshots s14 and s25 deleted at the ninth time point t9 are stored in the third memory block B3.

Data corresponding to snapshots deleted at the same or similar time points are stored in the same memory block. Accordingly, the memory block may be added to the victim block list 113 after a time point when data corresponding to a snapshot is invalidated. The memory block may include a lot of invalidated data after being added to the victim block list 113, thereby improving the efficiency of the garbage collection operation.

Figure 8:
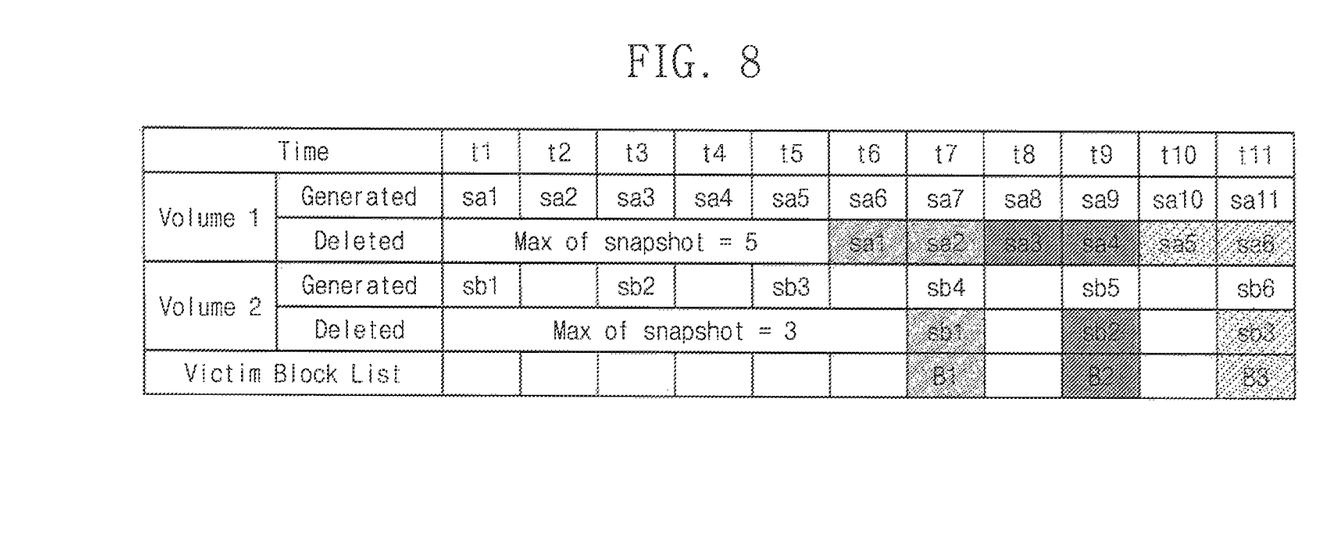

FIG. 8 is a drawing illustrating a victim block list managing method according to an exemplary embodiment of the inventive concept. Referring to FIG. 8, the memory system 100 includes first and second volumes. For example, the maximum number of snapshots of the first volume may be "5". The maximum number of snapshots of the second volume may be "3". The first and second volumes may have different generation periods.

Data may be stored in memory blocks based on a time point when a snapshot of the second volume with a long snapshot generation period is deleted. For example, data that corresponds to snapshots sa1, sa2, and sb1 deleted at the sixth time point t6 and the seventh time point t7 are stored in the first memory block B1. Data that corresponds to snapshots sa3, sa4, and sb2 deleted at the eighth time point t8 and the ninth time point t9 are stored in the second memory block B2. Data that corresponds to snapshots sa5, sa6, and sb3 deleted at the tenth time point t10 and the eleventh time point t11 are stored in the third memory block B3.

Data corresponding to snapshots deleted at the same or similar time points may be stored in the same memory block. Accordingly, the memory block may be added to the victim block list 113 after a time point when data corresponding to a snapshot is invalidated. The memory block may include a lot of invalidated data after being added to the victim block list 113, thereby improving the efficiency of the garbage collection operation.

Figure 9:
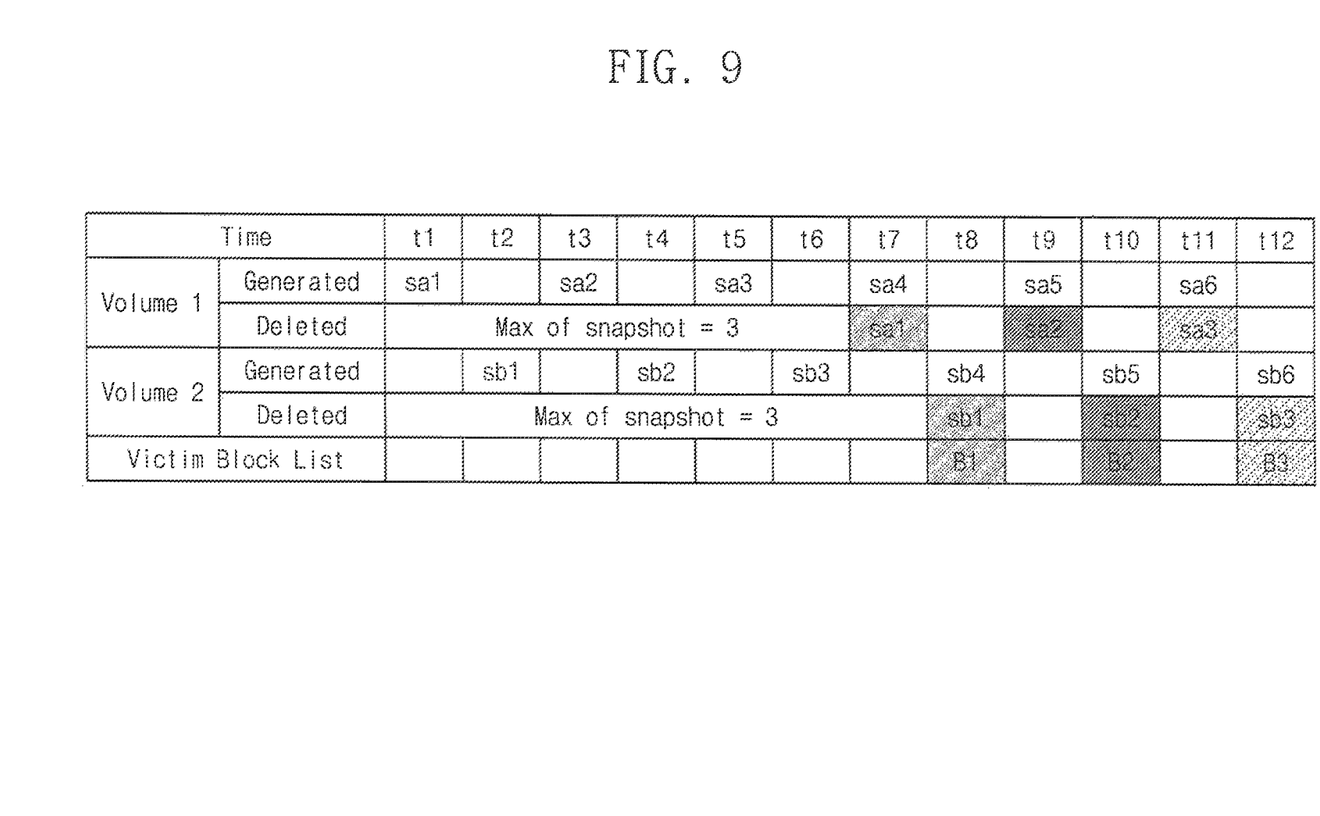

FIG. 9 is a drawing illustrating a victim block list managing method according to an exemplary embodiment of the inventive concept. Referring to FIG. 9, the memory system 100 includes first and second volumes. In this example, the first and second volumes perform the snapshot function. For example, the maximum number of snapshots of each of the first and second volumes may be "3". However, snapshot generation periods of the first and second volumes are not synchronized with each other.

Data is stored in memory blocks based on a time point when a snapshot of the second volume, of which the snapshot generation period is later than that of the first volume, is deleted. For example, data that corresponds to snapshots sa1 and sb1 deleted at the seventh time point t7 and the eighth time point t8 are stored in the first memory block B1. Data that corresponds to snapshots sa2 and sb2 deleted at the ninth time point t9 and the tenth time point t10 are stored in the second memory block B2. Data that corresponds to snapshots sa3 and sb3 deleted at the eleventh time point t11 and the twelfth time point t12 are stored in the third memory block B3.

Data corresponding to snapshots deleted at the same or similar time points may be stored in the same memory block. Accordingly, the memory block may be added to the victim block list 113 after a time point when data corresponding to a snapshot is invalidated. The memory block may include a lot of invalidated data after being added to the victim block list 113, thereby improving the efficiency of the garbage collection operation.

Figure 10:
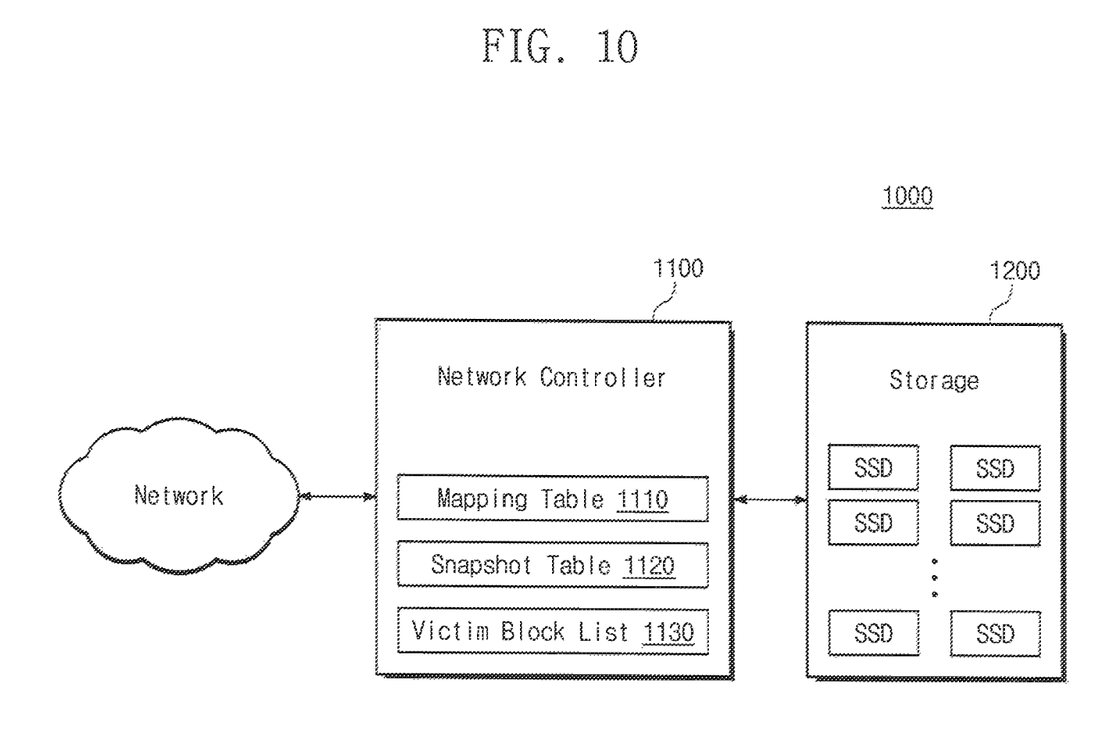
FIG. 10 is a block diagram illustrating a server system according to an exemplary embodiment of the inventive concept.

FIG. 10 is a block diagram illustrating a server system according to an exemplary embodiment of the inventive concept. Referring to FIG. 10, a server system 1000 includes a network controller 1100 and storage device 1200. The server system 1000 may be connected with at least one client over a network. The server system 1000 may create volumes for respective clients. Accordingly, the server system 1000 may be connected with volumes of various sizes.

The network controller 1100 may provide an interface between the network and the storage device 1200. The network controller 1100 includes a mapping table 1110, a snapshot table 1120, and a victim block list 1130. For example, the mapping table 1110 may store logical addresses of data stored in memory blocks included in the storage 1200. The snapshot table 1120 may store logical addresses of data corresponding to snapshots of volumes of the network.

The storage 1200 may include at least one SSD. The at least one SSD may be assigned for each volume of the network for management. The storage 1200 may be managed according to the victim block list managing method described with reference to FIGS. 1 to 9.

According to an embodiment of the inventive concept, a storage system including a nonvolatile memory device may improve the efficiency of a garbage collection operation while providing a snapshot function.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A storage system comprising:
a nonvolatile memory device comprising first and second memory blocks and configured to store data corresponding to first and second volumes, a plurality of first snapshots of the first volume, and a plurality of second snapshots of the second volume; and
a processor configured to perform a snapshot function on the data corresponding to the first and second volumes to generate the first and second snapshots,
wherein the processor stores data corresponding to the snapshots to be deleted within a first time period in the first memory block, adds the first memory block to a victim list after the first time period, stores data corresponding to the snapshots to be deleted within a second time period later than the first time period in the second memory block, and adds the second memory block to the victim block list after the second time period,
wherein the processor determines the first time period and the second time period based on a maximum number of snapshots of each of the first and second volumes, and
wherein the processor performs garbage collection on at least one memory block listed in the victim block list.

2. The storage system of claim 1, wherein the processor is configured to store the maximum number of snapshots of each of the first and second volumes.

3. The storage system of claim 1, wherein the processor stores data corresponding to the snapshots to be deleted at a first time point of the first time period in the first memory block and data corresponding to the snapshots to be deleted at a second time point of the first time period in the first memory block.

4. The storage system of claim 1, wherein the first time period is different from the second time period.

5. The storage system of claim 1, wherein the processor determines the first time period and the second time period based on a snapshot generation period of the first volume and a snapshot generation period of the second volume.

6. The storage system of claim 1, wherein the maximum number of snapshots of the first volume is different from the maximum number of snapshots of the second volume.

7. The storage system of claim 1, wherein the processor stores data of a third volume, which does not perform the snapshot function, in a third memory block.

8. A storage system comprising:
a nonvolatile memory device comprising first and second memory blocks and configured to store data corresponding to first and second volumes; and
a processor configured to perform a snapshot function on the data corresponding to the first volume to generate first snapshots, to perform the snapshot function on the data corresponding to the second volume to generate second snapshots, and store data corresponding to the snapshots to be deleted within a first time period in the first memory block and data corresponding to the snapshots to be deleted within a second later time period in the second memory block,
wherein the processor is configured to add the first memory block to a victim block list after the first time period and add the second memory block to the victim block list after the second time period,
wherein the processor determines the first time period and the second time period based on sizes of the data corresponding to the first and second volumes and a time point at which each of the first and second snapshots are deleted, and
wherein the processor performs garbage collection on at least one memory block listed in the victim block list.

9. The storage system of claim 8, wherein each memory block includes snapshots of both the first and second volumes.

10. The storage system of claim 8, wherein the snapshot function creates an ISO image of the corresponding volume.

11. The storage system of claim 8, wherein the nonvolatile memory device includes a third memory block and the processor is prevented from performing the snapshot function on data stored in the third memory block.

12. The storage system of claim 8, wherein the processor performs the snapshot function on the data corresponding to the first volume at a first rate and performs the snapshot function on the data corresponding to the second volume at a second other rate.

* * * * *